Sept. 18, 1951 — L. A. PARKER — 2,568,022
BARBECUE OVEN
Filed Feb. 2, 1949 — 2 Sheets-Sheet 1

Inventor
Leonard A. Parker

Sept. 18, 1951         L. A. PARKER         2,568,022
BARBECUE OVEN
Filed Feb. 2, 1949                              2 Sheets-Sheet 2
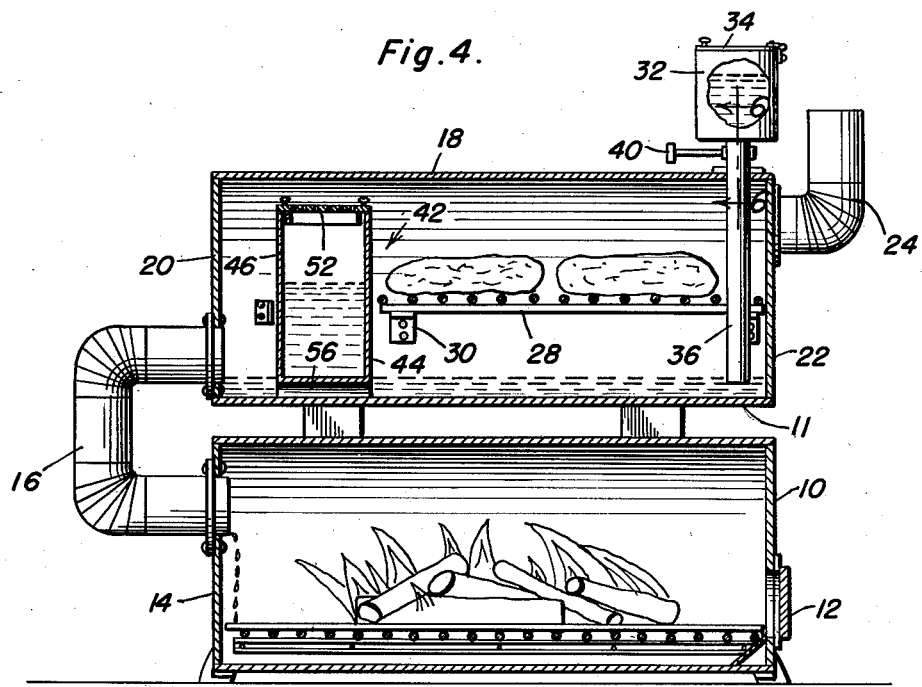
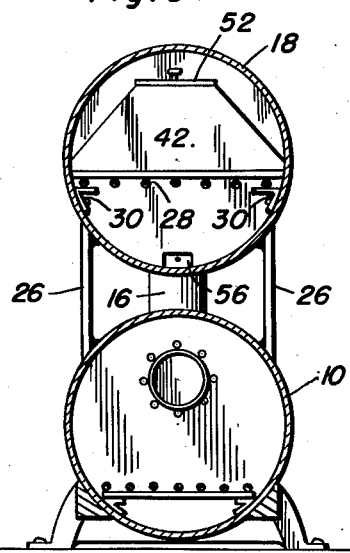
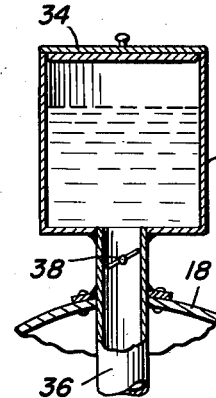
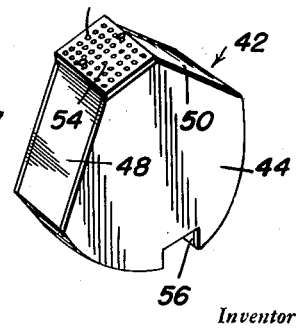
Inventor
Leonard A. Parker
By
*Attorneys*

Patented Sept. 18, 1951

2,568,022

UNITED STATES PATENT OFFICE 2,568,022

BARBECUE OVEN

Leonard A. Parker, De Witt, Ark.

Application February 2, 1949, Serial No. 74,178

5 Claims. (Cl. 99—259)

This invention relates to novel and useful improvements in a barbecue oven and more specifically pertains to a barbecue apparatus for barbecuing and cooking meat in an improved manner.

The principal object of this invention is to provide an apparatus for barbecuing and roasting meats in a manner which will tenderize, thoroughly cook and pleasingly flavor the meat in a more efficacious manner and without appreciable danger of burning the meat, and with a great saving of time and personal attention of the chef.

The objects of the invention are generally attained by providing an improved barbecue apparatus comprising a stove upon which is mounted and support thereabove, a barbecue oven having an inlet conduit in one end wall thereof adjacent the bottom of the oven for supplying thereto the entire products of combustion of the stove, and having in the end wall adjacent the upper portion thereof at the opposite end of the oven an outlet conduit for discharging the products of combustion therefrom. The oven is preferably cylindrical in shape and adjacent the outlet conduit and above the floor of the oven is provided with a grill for supporting meat or the like, while above the oven is provided a sauce container with controllable means for dispensing sauce into the bottom of the oven beneath the meat grill.

A further essential of the invention comprehends the provision of a liquid tank extending entirely transverse the lower portion of the oven and resting upon the bottom thereof, which tank is provided with a foraminous or grilled top and which tank is disposed between the meat supporting grill and the inlet conduit, to thereby receive direct impingement of the heated gases entering the oven for heating and vaporizing the liquid within the tank, and for preventing direct flow of the gases through the oven.

And a final important feature of the invention resides in the provision of a longitudinally extending restricted channel, conduit or passage extending through the tank at the bottom thereof, whereby liquid sauce contained within the oven between the tank and the end of the oven containing the outlet conduit, may have a restricted flow from the oven into the inlet conduit, and pass therefrom into the stove, whereby the sauce will be vaporized and recirculated by means of the inlet conduit throughout the oven for further impregnating the meat, improving its flavor, and moistening the same.

These, together with various ancillary features and objects of the invention which will later become apparent, are attained by the present invention, a preferred embodiment of which has been illustrated by way of example only in the accompanying drawings, wherein:

Figure 4 is a vertical central longitudinal sectional view through the apparatus taken substantially upon the plane of the section line 4—4 of Figure 1 and showing the interior construction of the stove and oven;

Figure 5 is a vertical transverse sectional detail view taken substantially upon the plane of the section line 5—5 of Figure 2 and showing further details of the interior construction of the apparatus;

Figure 6 is a fragmentary vertical transverse sectional detail view through the sauce dispensing mechanism, taken substantially upon the plane of the section line 6—6 of Figure 4; and Figure 7 is a perspective view of the particular tank construction employed with the improved barbecue apparatus.

Figure 1:
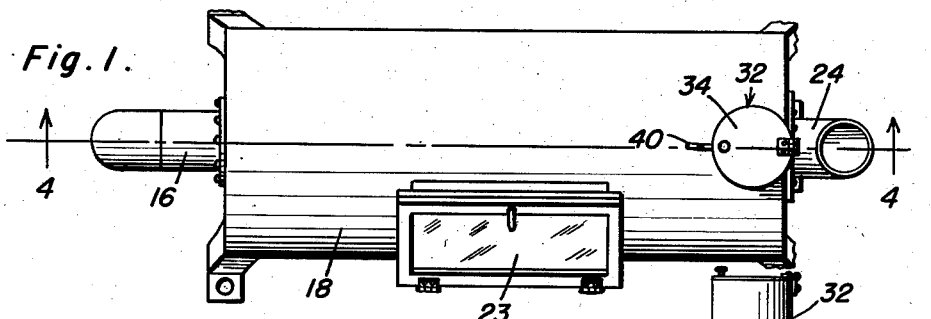
Figure 1 is a top plan view of a suitable embodiment of apparatus constructed in accordance with this invention.

Referring now more specifically to the accompanying drawings, wherein like numerals designate similar parts throughout the various views, it will be seen that the numeral 10 designates a stove which may be of any conventional type, and as illustrated consists of a cylindrical casing having an opening 12 therein for feeding products of combustion into the stove, and having a rear wall 14 with the upper portion of which communicates a conduit 16 which constitutes an inlet means for conveying all of the products of combustion of the stove 10 into the novel barbecue oven 18 whose construction forms an essential feature of this invention.

It should be understood that although in the embodiment illustrated the inlet conduit means 16 of the oven delivers all of the products of combustion of the stove thereto, it is evident that various control means could be provided for delivering only a predetermined and regulated portion of the products of combustion from the stove to the barbecue oven 18 as occasion dictates.

Figure 2:
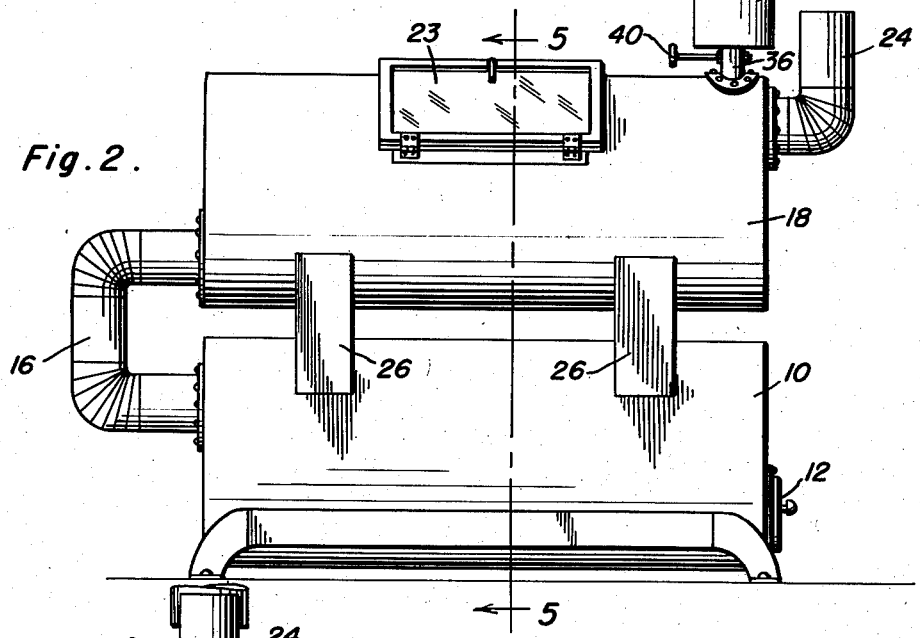
Figure 2 is a side elevational view of the device of Figure 1.
Figure 3:
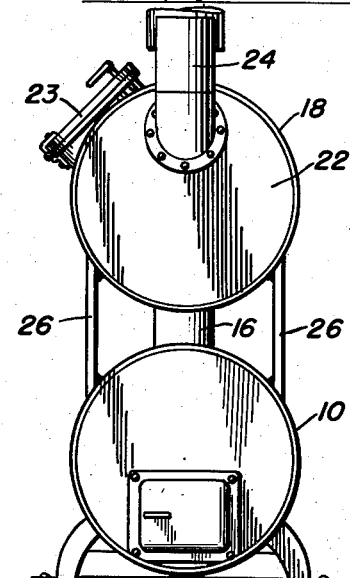
Figure 3 is an end elevational view taken from the right side of the device shown in Figures 1 and 2.

The barbecue oven 18 may likewise be of various shapes and sizes, and a suitable arrangement as illustrated in Figures 1–5, comprises a substantially cylindrical casing having what may be termed rear and front end walls 20 and 22, the inlet conduit means 16 extending through the rear wall 20 adjacent the bottom portion thereof, while the front end wall 22 is provided with an outlet means or conduit 24 adjacent the top of the front wall 22, whereby the products of combustion after passing through the oven 18 may be discharged either directly or through any suitable control means not illustrated, to the atmosphere.

Obviously, the barbecue oven 18 could be disposed in various relations to the stove 10, but in the interest of compactness and in forming a unitary assembly, it is preferred to mount the same directly above and supported upon the stove 10, by means of suitable supporting plates 26, which may be welded or otherwise rigidly connected and attached to the casings of the stove 10 and the oven 18. By this means, the stove and oven are formed as a rigid but light weight unitary assembly.

Referring now more particularly to Figure 4 for an understanding of the interior construction of the improved barbecue oven 18, it will be noted that the latter is provided with a meat supporting grill 28, mounted above the bottom wall 11 and substantially at the mid-portion thereof, and extending from the front wall 22 to a position past the mid-center of the oven but spaced from the rear wall 20 thereof. As shown clearly in Figures 4 and 5, this grill 28 being mounted upon suitable support brackets 30 carried by the inner cylindrical walls of the oven. It should be here noted, that the end walls 20 and/or 22 of the oven 18 may be removable in order to obtain convenient access to the interior of the oven for servicing or replacing the parts therein, and for introducing and removing meat and the like from the oven, while a door 23 of conventional design is also employed.

Adjacent the front wall 22 of the oven 18, and mounted above the oven in any suitable manner, is a container 32 having a removable cover 34, by means of which a meat sauce or the like may be introduced into the container as desired. The container communicates with a conduit 36 which, as shown in Figure 4, terminates adjacent the bottom of the oven 18 and beneath the grill 28 thereof, but closely adjacent the front wall 22. This conduit may be provided with a valve means of any suitable type, such as that indicated as a butterfly type of valve at 38 in Figure 6, which valve is manually adjustable by a control means 40. During operation of the device it is contemplated that a meat sauce of any suitable character may be placed in the sauce container 32, and by means of the valve 38 may be slowly dripped or fed into the oven 18, to collect and accumulate upon the bottom thereof.

To further enhance the efficiency of operation of the improved oven, a tank 42 for water or any other meat treating liquid is placed within the oven. This tank includes front and rear walls 44 and 46 which are connected by a curved bottom wall conforming to the interior surface of the bottom of the oven 18, and resting snugly thereagainst, and by sloping top walls 48 and 50, which terminate in an open top which is closed by a cover plate 52 preferably having a plurality of openings 54 therein in the form of slots, apertures or the like. The front wall 44 of the tank upon placing the oven as shown in Figures 4 and 5, extends completely across the oven 18 at the bottom portion thereof to form a partition by means of which the meat sauce is retained between the front wall 22 and the partition 44, and accumulates beneath the grill 28. However, the bottom wall of the tank is further provided with a longitudinally extending raised portion forming a channel, groove or passage 56, which permits a restricted flow of the collected meat sauce from the forward side of the partition and tank to slowly pass therebeneath from whence the trickle or seepage of meat sauce may descend by gravity through the inlet conduit 16 and be discharged into the stove 10. It is contemplated that during this flow of meat sauce from the oven to the stove, that the sauce will be vaporized during its passage through the inlet means 16 or in the oven 10 by the hot combustion products coming in contact therewith, and this sauce vapor will then be reintroduced into the oven 18 and circulated by means of the flow of gases therethrough, thus thoroughly impregnating or treating the meat, flavoring the same, and by means of the moisture retaining the same in a soft condition.

It should be further observed that the location of the tank 42, which thus completely obstructs the lower portion of the oven 18, is directly in front of the inlet means 16, to thereby receive the direct impingement of the flow of heated gases from the stove into the oven. This direct impingement of the gases upon the tank serves the dual functions of feeding the tank thus vaporizing its contents, whether water or other liquid, and further compels the gases to follow a tortuous path in their flow through the oven, thus thoroughly heating and treating the contents thereof.

It will be further noted that the sloping top sides 48 and 50 of the tank will divide the stream of gases entering the oven from the conduit 16, compelling a portion to flow over the top of the cover 54, while the divided remainder flows across the inclined top surfaces 48 and 50, thus effectively dispersing the flow of gases throughout the oven for more effectively heating and treating the meat therein.

From the foregoing, the construction and operation of the device will be readily understood and further explanation regarding the same is believed to be unnecessary.

However, since various modifications and changes will readily occur to those skilled in the art after a consideration of the foregoing specification and the accompanying drawings, it is not desired to limit the invention to the exact construction shown and described, but all suitable modifications and equivalents may be resorted to falling within the scope of the appended claims.

Having described the invention, what is claimed as new is:

1. A barbecue oven comprising an elongated closed casing having a bottom and a top, inlet means for introducing heated gases into a first end of said oven adjacent the bottom thereof, outlet means adjacent the top of the other end of the oven for discharging gases from the interior thereof, a meat supporting grill in said oven above the floor thereof and adjacent said other end, means for dispensing sauce into said oven, a liquid tank resting upon the floor of said oven and extending transverse the interior thereof, said tank being positioned adjacent said first end and said inlet means for receiving the direct impingement of the heated gases whereby to vaporize said liquid and prevent uninterrupted flow of the gases through the oven, said tank having discharge means for releasing vaporized liquid therefrom into the gases flowing through said oven.

2. The combination of claim 1, including a restricted passage through said tank at the bottom thereof to provide a controlled flow of sauce from the bottom of said oven into said inlet means for vaporization of said sauce and subsequent return and circulation of the sauce vapors in the oven.

3. A barbecue apparatus comprising a firebox, a barbecue oven mounted above said firebox, said oven comprising an elongated horizonally disposed closed casing having a bottom and a top, inlet means for introducing heated gases into a first end of said oven adjacent the bottom thereof, outlet means adjacent the top of the other end of the oven for discharging gases from the interior thereof, a meat supporting grill in said oven above the floor thereof and adjacent said other end, means for dispensing sauce into said oven, said inlet means delivering the products of combustion of said fire-box to said oven, a liquid tank resting upon the floor of said oven and extending transverse the interior thereof, said container being positioned adjacent said first end and said inlet means for receiving the direct impingement of the heated gases whereby to vaporize said liquid and prevent uninterrupted flow of the gases through the oven, said tank having discharge means for releasing vaporized liquids therefrom into the gases flowing through said oven.

4. A barbecue apparatus comprising a firebox, a barbecue oven mounted above said firebox, said oven comprising an elongated horizontally disposed closed casing having a bottom and a top, a conduit communicating with said fire-box and with a first end of said oven adjacent the bottom for introducing heated gases into one end of said oven adjacent the bottom thereof, outlet means adjacent the top of the other end of the oven for discharging gases from the interior thereof, a meat supporting grill in said oven above the bottom thereof and adjacent said other end, delivery means for dispensing sauce into said oven, said conduit delivering the products of combustion of said fire-box to said oven, a partition extending transverse the lower portion of said oven between said meat supporting grill and the conduit for retaining sauce in the bottom of said oven beneath said grill, a restricted passage in said partition to provide a controlled flow of sauce from the bottom of said oven into said conduit for vaporization of said sauce and subsequent return and circulation of the sauce vapors in the oven.

5. The combination of claim 3, including a restricted passage through said tank at the bottom thereof to provide a controlled flow of sauce from the bottom of said oven into said inlet means for vaporization of said sauce and subsequent return and circulation of the sauce vapors in the oven.

LEONARD A. PARKER.

REFERENCES CITED

The following references are of record in the file of this patent:

UNITED STATES PATENTS

| Number | Name | Date |
| --- | --- | --- |
| 84,194 | Kassen | Nov. 17, 1868 |
| 492,257 | Baker et al. | Feb. 21, 1893 |
| 626,029 | Malice | May 30, 1899 |
| 948,149 | Stoddard | Feb. 1, 1910 |
| 1,275,959 | Martin et al. | Aug. 13, 1918 |
| 1,595,846 | Wood | Aug. 10, 1926 |
| 1,837,924 | Rutherford | Dec. 22, 1931 |
| 1,896,192 | Cain | Feb. 7, 1933 |
| 1,964,372 | Tygart | June 26, 1934 |
| 1,977,486 | Louis | Oct. 16, 1934 |
| 2,059,666 | Thompson | Nov. 3, 1936 |
| 2,109,796 | Hirschenfeld | Mar. 1, 1938 |
| 2,477,586 | Dodules | Aug. 2, 1949 |

FOREIGN PATENTS

| Number | Country | Date |
| --- | --- | --- |
| 26,827 | Great Britain | Nov. 26, 1906 |
| 199,939 | Great Britain | July 5, 1923 |
| 271,877 | Germany | Aug. 24, 1912 |